United States Patent [19]
Wiedenfeld et al.

[11] 4,423,312
[45] Dec. 27, 1983

[54] METHOD FOR HEATING PARISONS MADE OF THERMOPLASTIC MATERIAL

[76] Inventors: Walter Wiedenfeld, Tannenweg 28, 2000 Hamburg 62; Wolfgang Reymann, Falckweg 14, 2000 Hamburg 52, both of Fed. Rep. of Germany

[21] Appl. No.: 409,660

[22] Filed: Aug. 19, 1982

[30] Foreign Application Priority Data

Sep. 9, 1981 [DE] Fed. Rep. of Germany ....... 3135755

[51] Int. Cl.³ .......................... F27B 9/06; H05B 1/00; B29C 17/07
[52] U.S. Cl. ..................................... 219/388; 264/25; 219/354; 219/411; 432/124; 34/4; 34/105
[58] Field of Search ............... 219/388, 354, 405, 411; 432/121, 122, 239, 124; 246/25, 345, 328.14; 34/4, 6, 39, 105

[56] References Cited

U.S. PATENT DOCUMENTS

| | | | |
|---|---|---|---|
| 3,865,912 | 2/1975 | Rosenkranz | 264/25 |
| 3,950,459 | 4/1976 | Seefluth | 264/25 |
| 4,079,104 | 3/1978 | Dickson | 264/25 |
| 4,117,050 | 9/1978 | Appel | 219/354 |
| 4,204,111 | 5/1980 | Yonko | 219/411 |

Primary Examiner—B. A. Reynolds
Assistant Examiner—Teresa J. Walberg
Attorney, Agent, or Firm—Posnack, Roberts, Cohen & Spiecens

[57] ABSTRACT

Parisons are passed along a plurality of heating boxes for heating them to a temperature desired for blow molding. Individual radiators are switched off in groups to obtain varying temperatures along the axial direction of the parisons.

5 Claims, 2 Drawing Figures

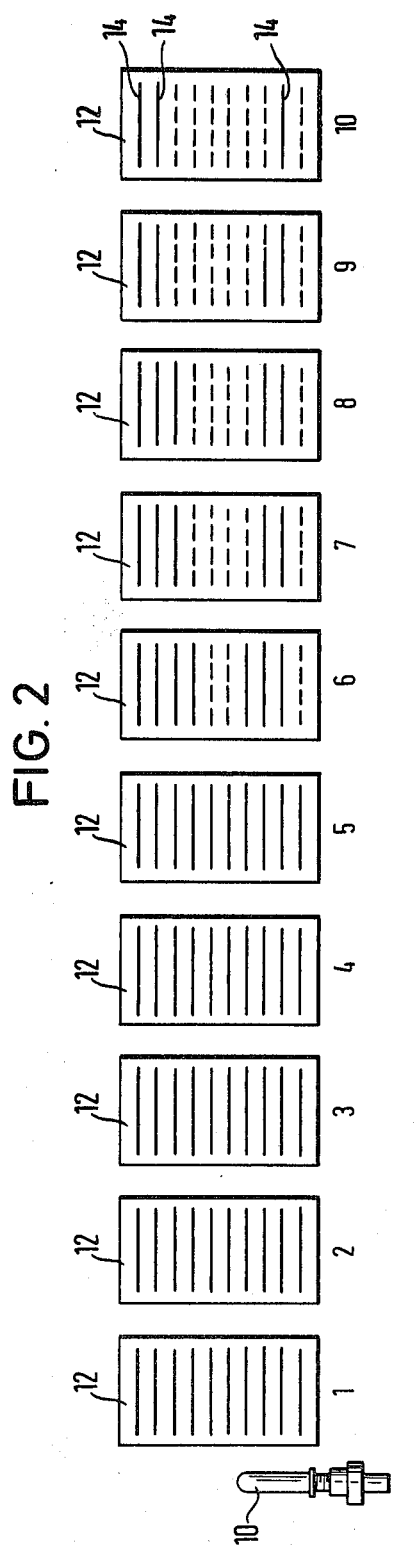
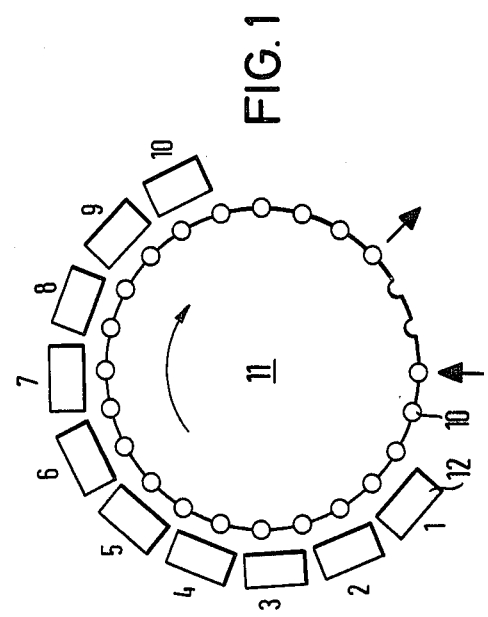

METHOD FOR HEATING PARISONS MADE OF THERMOPLASTIC MATERIAL

DESCRIPTION

1. Field of the Invention

The invention relates to a method for heating parisons made of thermoplastic material to a temperature desired for blow molding, comprising the steps of moving the parisons past a plurality of heating boxes located one after the other in the direction of conveying said parisons, each heating box including a number of infrared radiator sources horizontally located one above the other with respect to the longitudinal axis of said parisons and varying the radiation energy supplied to said parisons to constitute a temperature profile in the longitudinal axis of the parisons.

2. Prior Art

Hitherto, parisons to be heated are moved one after the other past stationary heating boxes each of them comprising a number of radiators which are placed horizontally one above the other.

It is further known to generate a temperature profile along the axis of a parison to obtain varying wall thicknesses of the container in the subsequent blow molding step. In blowing the heated parison to a hollow article, the stretch ratio of the wall portions varies to a substantial extent depending on whether the wall portion to be blown is the bottom area, the neck portion of the hollow article or the area in between. As a rule, the artisan selects the temperature profile of the parison such that the finished article will exhibit equal wall thicknesses despite the varying stretch ratio.

When the temperature profile is generated by controlling the supply voltage of the radiators in the heating boxes, the radiator temperature is varied and thus the radiator energy acting on the parisons is changed. Accordingly, the variation of the supply voltage results in a change of radiator temperature. This means, however, a spectral shift as the wave length of the radiation delivered is varied. When the supply voltage is decreased to adjust a radiator to deliver less heat it also delivers less light, the depth of penetration of the radiation energy in the wall of the parison to be heated being decreased caused by the spectral shift of wave length towards an increasing wave length.

SUMMARY OF THE INVENTION

Accordingly, it is an object of the present invention to provide a method for varying the radiation energy to be delivered to parisons, but to maintain constant the penetration depth.

According to the teachings of the invention, an improvement is provided which comprises switching off a number of selected radiators in the heating boxes to obtain the desired temperature profile and feeding the radiators which are switched on with a voltage generating a maximum light intensity.

According to the invention, all radiators are adjusted to a constant temperature resulting in a maximum brightness by controlling the supply voltage correspondingly. Thus, maximum efficiency is obtained and the depth of penetration of the radiation into the wall material of the parison to be heated is kept constant. The temperature profile is exclusively obtained by switching off individual radiators in the heating boxes.

A specific embodiment of the invention is described in detail below.

BRIEF DESCRIPTION OF THE DRAWING

In the attached drawings:

FIG. 1 is a top view of a plurality of heating boxes located along the periphery of a heating wheel and FIG. 2 is a side view of a number of heating boxes located one after the other in the conveying direction of a parison.

DETAILED DESCRIPTION

Referring to the drawings, a number of parisons 10 taken up along the periphery of a heating wheel 11 which is rotatably driven about a vertical axis, is moved past a number of heating boxes 12 to be heated to a temperature desired for a subsequent blow molding step.

According to FIG. 2, each heating box 12 includes a plurality of radiators 14 which are horizontally located one above the other along the longitudinal axis of the parison 10. In the present embodiment, ten heating boxes each having ten radiators one above the others are provided. To obtain the desired temperature profile a number of individual radiators 14 is switched off as shown in broken lines in FIG. 2. It should be understood that the number of radiators to be switched off is increased in the conveying direction of the parisons, whereas feeding the supply voltage for maximum light intensity, i.e. shortest wave length and highest depth of penetration to the radiators not switched off is continued.

In case this method of control leads to a temperature increase so large it may be additionally considered to decrease the supply voltage of the radiators or, respectively, of a number of radiators still switched on. As the supply voltage is controlled only in addition to switching off the radiators, the variation of the supply voltage and thus the wave length shift and variation of penetration depth is of course substantially less than in the case of controlling the supply voltage alone.

We claim:

1. A method for heating parisons made of thermoplastic material to a temperature desired for blow molding comprising the steps of
   (a) moving the parisons past a plurality of heating boxes,
   (b) arranging the heating boxes in the conveying direction of said parisons, each heating box including a plurality of infrared radiator sources located horizontally one above the other,
   (c) varying the radiation energy applied to the parisons to provide a temperature profile in the axial direction of said parisons by switching off individually selected radiator sources, and
   (d) feeding all the remaining radiator sources with a voltage resulting in maximum light intensity whereby penetration depth of the radiation energy in the wall of the parison will remain constant.

2. A method as claimed in claim 1 wherein the parisons are advanced along a curved path.

3. A method as claimed in claim 2 wherein said heating boxes extend around the curved path of travel of the parisons.

4. A method as claimed in claim 1 wherein all the radiator sources which are switched on are at equal maximum light intensities.

5. A method as claimed in claim 4 wherein the radiator sources which are switched off have zero light intensity.

* * * * *